United States Patent [19]
Abe et al.

[11] Patent Number: 5,314,317
[45] Date of Patent: May 24, 1994

[54] METHOD OF WORKING SCROLL MEMBER OF SCROLL COMPRESSOR

[75] Inventors: Nobuo Abe; Tatsuo Horie, both of Tochigi; Toshio Yamanaka, Yokohama; Atsui Simada, Tochigi, all of Japan

[73] Assignee: Hitachi, Ltd., Tokyo, Japan

[21] Appl. No.: 77,105

[22] Filed: Jun. 16, 1993

[30] Foreign Application Priority Data

Jun. 19, 1992 [JP] Japan .................. 4-160526

[51] Int. Cl.⁵ .............................. F01C 1/02
[52] U.S. Cl. ...................... 418/55.2; 279/123
[58] Field of Search ............... 418/55.1, 55.2; 279/123, 141

[56] References Cited

U.S. PATENT DOCUMENTS

| 4,838,562 | 6/1989 | Akashi | 279/123 |
| 5,103,558 | 4/1992 | Herrick et al. | 418/55.1 |

FOREIGN PATENT DOCUMENTS

| 1187388 | 7/1989 | Japan . |
| 1262302 | 10/1989 | Japan . |
| 335911A | 2/1991 | Japan . |
| 3221307 | 9/1991 | Japan . |

Primary Examiner—Richard A. Bertsch
Assistant Examiner—Charles G. Freay
Attorney, Agent, or Firm—Antonelli, Terry, Stout & Kraus

[57] ABSTRACT

Disclosed is a method of working a semi-finished scroll member for a scroll compressor which has a circular end plate having a first end face and a second end face with a spiral wrap extending therefrom. Before the second end face and the wrap are machined, the outer peripheral surface of the end plate is formed therein with a circumferencial groove to provide jaw finger engaging surfaces spaced from the first and second end faces of the end plate. Then, radial grooves are formed in the outer periphery of the end plate such that each groove extends between and is open in one of the jaw finger engaging surfaces and in the first end face of the end plate. Thereafter, the semi-finished scroll member is positioned relative to a machine tool such that the first axial end face of the end plate is placed adjacent a back-up member of the machine tool. Then, jaw fingers of the machine tool are moved into engagement with the jaw finger engaging surfaces of the semi-finished scroll member, respectively, and are further moved axially of the machine tool toward the back-up member until the first axial end face of the end plate is urged against the back-up plate, whereby the semi-finished scroll member is firmly fixed to the machine tool and ready for machining of the second axial end face of the end plate and of the spiral wrap thereon.

7 Claims, 4 Drawing Sheets

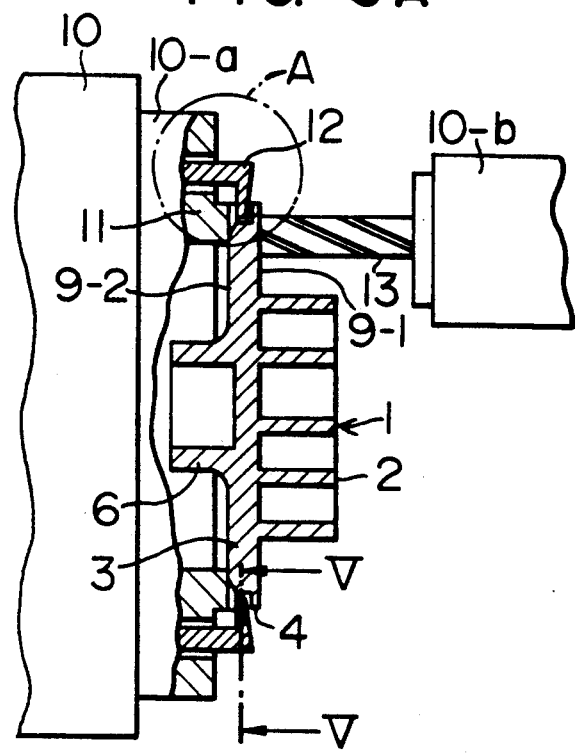
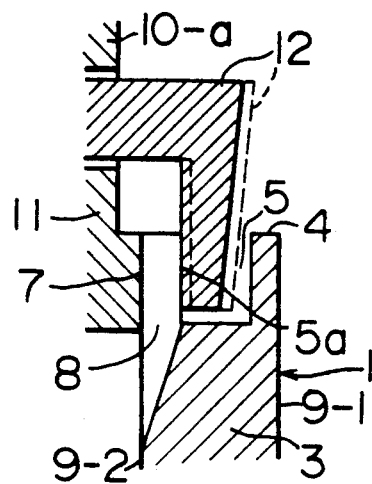
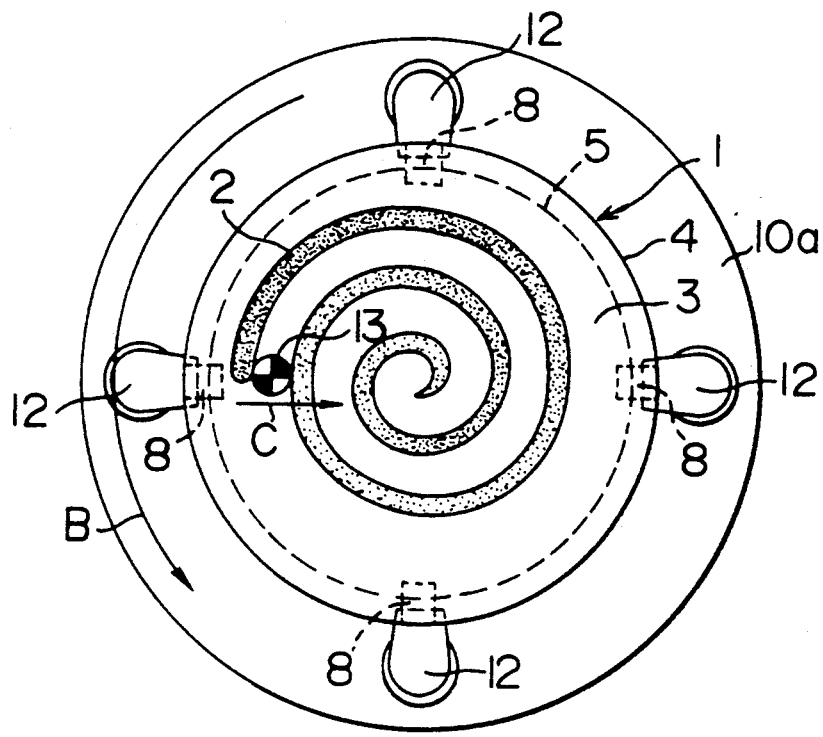

METHOD OF WORKING SCROLL MEMBER OF SCROLL COMPRESSOR

BACKGROUND OF THE INVENTION

1. Field of the Invention

The present invention relates generally to scroll compressors and, more particulary, to a method of precisely working at least one of stationary and orbiting scroll members to be assembled to form a pump section of a scroll compressor.

2. Description of the Prior Art

Japanese Unexamined Patent Publication No. 1-187,388 shows the structure of a pump section of a scroll compressor. Such pump section of a scroll compressor will be described hereinunder with reference to FIG. 9.

A stationary scroll member 21 has a spiral wrap 21a upstanding from one surface of a substantially circular base or end plate 21b such that the inner and outer peripheral surfaces of the wrap 21a are perpendicular to the end plate 21b. An orbiting scroll member 22 has a spiral wrap 22a upstanding from one surface of a substantially circular base or end plate 22b such that the inner and outer peripheral surfaces of the wrap 22a are perpendicular to the end plate 22b. The two scroll members 21 and 22 are assembled such that the spiral wraps 21a and 22a are meshing engagement with each other and cooperate to define a compression chamber 30.

The orbiting scroll member 22 is provided with a cylindrical bearing portion 22c extending from the other surface of the end plate 22b. Radial key grooves are formed in the other surface of the end plate 22b radially outwardly of the bearing portion 22c and engaged by axial projections 24a of an oldhams ring 24. The outer periphery of the stationary scroll member 21 is secured by bolts 26 to an outer periphery of a frame 23 having an end which is recessed to receive therein the orbiting scroll member 22 and the oldhams ring 24. The other end of the frame 23 is shaped to provide a tubular bearing 23a through which a crank shaft 25 extends from an electric motor (not shown) and has an eccentric end portion 25a received in the bearing portion 22c. The frame 23 has formed therein radial key grooves 23b which are engaged with further projections 24b extending from the oldhams ring 24 in its axial direction opposite to the axial direction in which the projections 24a extend from the oldhams ring 24. The eccentric portion 25a of the crank shaft 25 and the projections 24a and 24b of the oldhams ring 24 and the associated key grooves 22d and 23b cooperate to convert the rotation of the crank shaft 25 into an orbiting motion of the orbiting scroll member 22, so that the compression chamber 30 is moved in the pump section radially inwardly to suck gas (such as refrigerant gas) through a suction port 21-2 while the volume of the compression chamber 30 is gradually reduced to compress the thus sucked gas. When the compression chamber 30 is moved to the radially innermost position, the chamber 30 is communicated with a discharge port 21-1 so that the compressed gas is discharged out of the pump section through the discharge port 21-1.

In a hermetic scroll compressor, the aforedescribed pump section and the electric motor (not shown) are housed in a hermetic container which has a gas inlet pneumatically connected to the suction port so that refrigerant gas is sucked from a refrigeration cycle (not shown) through the gas inlet in the hermetic container and through the suction port 21-2 into the compression chamber 30. The hermetic container has formed therein a gas outlet communicated with the discharge port 21-1 of the pump section through the space defined in the container. Accordingly, compressed refrigerant gas is discharged from the pump section through the discharge port 21-1 and flows through the interior of the hermetic container to the gas outlet therein. Accordingly, the end plate 21b of the stationary scroll member 21 is designed to be of a large thickness to provide a sufficient rigidity to prevent the stationary scroll end plate 21b from being deformed by pressure exerted axially thereto by the compressed refrigerant gas discharged from the pump section through the discharge port 21-1 into the interior of the hermetic container.

On the other hand, the end plate 22b of the orbiting scroll member 22 is designed to have as small thickness and weight as possible so as to minimize the inertia of the orbiting scroll member which would cause vibration of the compressor when the orbiting scroll member is driven to make an orbiting motion by the eccentric portion 25a of the crank shaft 25. For this reason, the structure of the orbiting scroll end plate 22b is of a low rigidity.

An example of the methods of working (machining) the orbiting scroll member 22 is schematically shown in FIG. 10. A working machine or machine tool is shown to have a jaw chuck comprising gripping fingers 27 and a back-up plate 28. The chuck is designed such that the gripping fingers 27 are forcibly moved radially inwardly into gripping engagement with the outer peripheral surface of the circular end plate 22b of a semifinished orbiting scroll member 22 which has been prepared, for example, by casting a metal. While the scroll member 22 is so held by the gripping fingers 27 and the back-up plate 28, a cutting or grinding tool is brought into working engagement with the side of the end plate 22b remote from the back-up plate 28 to effect machining on that side of the end plate.

In the working method shown in FIG. 10, however, the gripping force radially inwardly exerted to the end plate 22b axially deforms the end plate away from the back-up plate 28 in a manner shown by broken lines in FIG. 10. It will therefore be appreciated that the machining of the orbiting scroll member 22 is conducted with the end plate 22b deformed in one axial direction thereof. Accordingly, when the radially inward gripping force is removed from the outer peripheral surface of the end plate 22b of the orbiting scroll member 22 when the machining is finished, the end plate 22b tends to recover to its initial shape. This working or machining method, therefore, fails to provide a precise flatness of the machined side of the orbiting scroll end plate 22b. In addition, the working method shown in FIG. 10 has a further disadvantage that the end plate 22b of the orbiting scroll member 22 cannot be kept in close contacting relationship with the back-up plate 28 because the end plate 22b is deformed axially away from the back-up plate 28, with a result that a variation is liable to occur in the precise thickness of the machined end plate 22b of the orbiting scroll member 22.

The performance of a scroll compressor is greatly influenced by the rate of gas leakage through gaps between side faces of meshed spiral wraps, between the end face of each wrap and an associated bottom face of an associated grooved bottom and between the end plates of stationary and orbiting scroll members. The scroll members can be machined with a substantial precision to obtain desired shapes of spiral wraps, desired heights thereof and desired depths of grooved bottoms. However, the flatness of each of the stationary and orbiting scroll members depends upon how the scroll member is gripped by a jaw chuck. The degree of the flatness of the end plate of each of stationary and orbiting scroll members directly influences the gap between the two end plates. With the structure of the conventional orbiting scroll member and with the conventional method of working orbiting scroll member, it has been quite difficult to obtain a desired precision of the flatness of the end plate of the orbiting scroll member. For this reason, a relatively thicker scroll end plate had to be employed to assure a desired rigidity of the end plate notwithstanding the fact the thicker end plate disadvantageously increases the weight thereof with a resultant increase in the inertia thereof and thus in an increase in the vibration of the compressor.

The above discussion is also applicable to the case in which the pump section is not accommodated in a hermetic container. In such a case, the discharge port 21-1 formed in the end plate 21b of the stationary scroll member 21 is connected directly to a refrigeration cycle, so that the pressure of the compressed gas discharged from the pump section does not act on the end plate 21b of the stationary scroll member 21. Accordingly, the stationary scroll end plate 21b should preferably be designed to be of as smaller thickness as possible to reduce its weight and inertia and thus to decrease the vibration of the compressor.

SUMMARY OF THE INVENTION

It is an object of the present invention to provide a structure of a scroll member of a scroll compressor which structure is improved to prevent the end plate of the scroll member from being axailly deformed while the end plate is gripped by a chuck jaw of a machine tool during machining of the end plate.

It is another object of the present invention to provide an improved method of working a scroll member which can prevent the end plate of the scroll member from being axially deformed while the end plate is gripped by a chuck jaw of a machine tool during machining of the end plate.

According to the present invention, a semifinished scroll member is prepared which comprises a substantialy circular end plate having a first axial end face and a second axial end face with a spiral wrap extending from the second axial end face. Then, the outer peripheral surface of the circular end plate is shaped to provide jaw finger engaging surfaces extending substantially perpendicularly to the axis of the end plate and spaced from the first and second end faces axially of the end plate. Then, radial cuts are formed in the outer periphery of the end plate such that each radial cut extends between and is opened in one of the jaw finger engaging surfaces and in the first axial end face of the end plate. The semi-finished scroll member is then positioned relative to a machine tool such that the first axial end face of the end plate is placed adjacent a back-up plate of the machine tool. Thereafter, gripping fingers of a chuck jaw of the machine tool are moved into engagement with the jaw finger engaging surfaces, respectively. The gripping fingers are then moved axially of the machine tool toward the back-up plate until the first axial end face of the end plate is urged against the back-up plate whereby the semi-finished scroll member is firmly fixed to the machine tool and ready for machining of the second end face of the end plate and of the spiral wrap thereon.

The jaw finger engaging surfaces may conveniently be provided by a circumferential groove formed in the outer peripheral surface of the end plate. Alternatively, each of the jaw finger engaging surfaces may be provided by a recess formed in the outer peripheral surface of the end plate. The radial cuts may comprise radially extending grooves formed in the outer periphery of the end plate adjacent the first end face thereof.

The jaw finger engaging surfaces and the jaws of the jaw chuck may preferably be dimensioned such that the width of each jaw finger bridges the opposite radial edges of the opening of an associated radial groove in an associated finger engaging surface. Accordingly, when the jaw fingers are axially moved to urge the first end face of the scroll member end plate, the material of the end plate between the jaw finger engaging surfaces and the first end face of the end plate may be deformed into the radial grooves to prevent the second end face of the end plate from being deformed by the axial clamping force exerted by the jaw fingers to the end plate.

Further objects, features and advantages of the present invention will be made more apparent by the following description of a preferred embodiment of the present invention with reference to the accompanying drawings.

BRIEF DESCRIPTION OF THE DRAWINGS

FIG. 3A is an axial sectional view of the orbiting scroll member mounted on a machine tool by a chuck jaw and being machined by an end mill;

FIG. 3B is an enlarged sectional view of a part of the orbiting scroll member and a part of the machine tool encircled by a circle A shown in FIG. 3A;

FIG. 4 is an end view of the orbiting scroll member and the machine tool schematically showing the motions of the scroll member and of the end mill;

DESCRIPTION OF PREFERRED EMBODIMENTS

Figure 1:
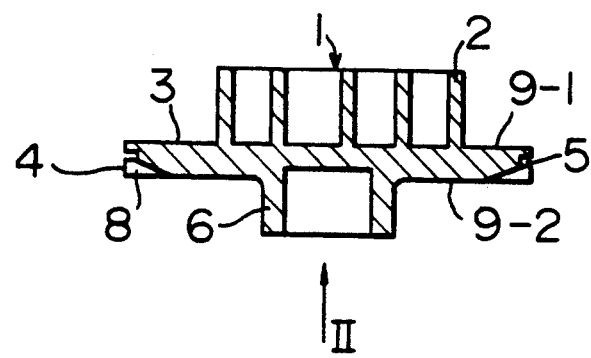
FIG. 1 is an axial sectional view of an example of an orbiting scroll member made by the method of the present invention.
Figure 2:
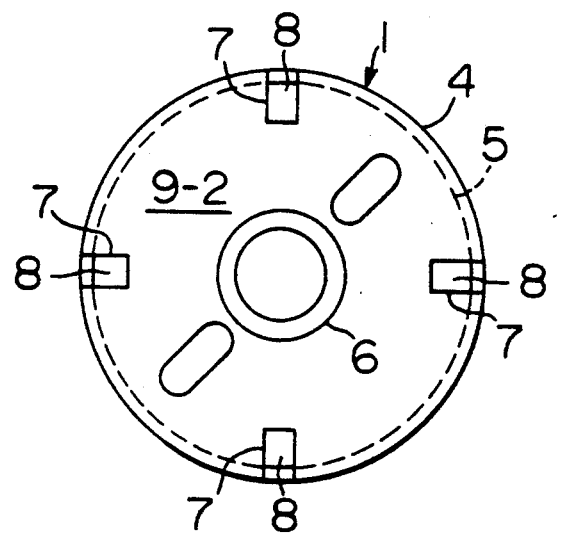
FIG. 2 is an end view of the orbiting scroll member shown in FIG. 1 as viewed in the direction indicated by an arrow II shown in FIG. 1.

An embodiment of the present invention will be described with reference to FIGS. 1–4 of the drawings.

A semi-finished orbiting scroll member 1 has a spiral wrap 2 upstanding from one 9-1 of the end faces of a substantially circular end plate 3 having an outer peripheral surface 4. A tubular bearing section 6 is formed on the other end face 9-2 of the end plate 3 and extends axially therefrom.

The semi-finished orbiting scroll member 1 is prepared by any of conventional methods such as casting a metal. Thus, the end plate 3 is integral with the spiral wrap 2 and the bearing section 6. The end faces 9-1 and 9-2 are substantially perpendicular to the axis of the end plate 3.

Before the end face 9-1 and the spiral wrap 2 of the semi-finished orbiting scroll member 1 are further worked by a machine tool 10 having a main shaft 10a for work (semi-finished scroll member), a spindle 10b for tool such as end mill 13 (FIG. 4) having an axis parallel to the axis of the main shaft 10a, and a back-up plate 11, a circumferential groove 5 is formed in the outer peripheral surface of the end plate 3 so as to extend continuously along the outer periphery of the end plate 3. The circumferential groove 5 may preferably be formed by machining the outer periphery of the end plate 3 of the semi-finished orbiting scroll member 1 by, for example, a lathe, for the purpose to be made apparent later and has suitable width (measured axially of the end plate) and depth (measured radially of the end plate). As will be best seen in FIG. 3B, the circumferential groove 5 has a side face 5a which is closer to the end face 9-2 of the end plate 3 than to the end face 9-1 and which is substantially perpendicular to the axis of the end plate 3, i.e., parallel to the end face 9-2.

A predetermined number of portions 7 to be gripped by jaw fingers 12 of a jaw chuck of the machine tool are determined along the outer periphery of the end plate 3. At the determined portions 7 to be gripped, radial cuts such as radial grooves 8 are formed in the end face 9-2 of the end plate 3 such that each radial groove 8 extends through the thickness of the end plate 3 between the end face 9-2 and the circumferential groove 5 and is open in the end face 9-2 of the end plate 3, in the side face 5a of the circumferential groove 5 and in the outer peripheral surface of the end plate 3.

The end face 9-2 of the end plate 3 may preferably be machined to have a good smoothness before the end face 9-1 and the spiral wrap 2 are machined, so that the end face 9-2 can be brought into an intimate contact with a back-up plate 11 of the machine tool 10 when the semi-finishied orbiting scroll member 1 is mounted on the machine tool.

Then, the semi-finished orbiting scroll member 1 is positioned relative to the machine tool 10 such that the end face 9-2 of the end plate 3 is adjacent the back-up plate 11. Thereafter, each of the jaw fingers 12 of the jaw chuck of the machine tool 10 is radially inwardly moved into the circumferential groove 5 into a position shown by a broken line shown in FIG. 3B and then further moved from the broken line position in the axial direction of the end plate 3 toward the back-up plate 11 to forcibly urge the end plate 3 against the back-up plate 11 for thereby fixing the semi-finished orbiting scroll member 1 to the main shaft 10a of the machine tool 10 such that the end face 9-2 of the end plate 3 is in intimate contact with the back-up plate 11. It is to be noted that the jaw fingers 12 are of a floating structure (not shown) so as to assure that a minor difference in dimension between the individual jaw fingers 12 due to a slight difference in shape therebetween can be taken up.

Then, the main shaft 10a of the machine tool 10 is rotated together with the semi-finished orbiting scroll member 1 in a direction indicated by an arrow B in FIG. 4. The end mill 13 is linearly moved as indicated by another arrow C shown in FIG. 4 in synchronism with the rotation of the semi-finished orbiting scroll member 1 to machine the end face 9-1 of the end plate 3 and the side faces of the spiral wrap 2.

Figure 5:
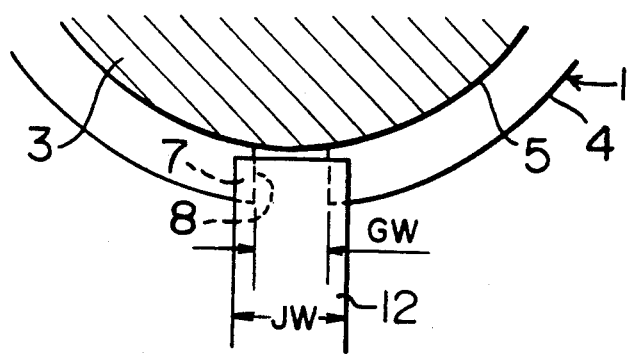
FIG. 5 is an enlarged fragmentary axial sectional view of the scroll member schematically illustrating the dimensional and positional relationship between a radial groove in the scroll member and a jaw finger of the jaw chuck.
Figure 6:
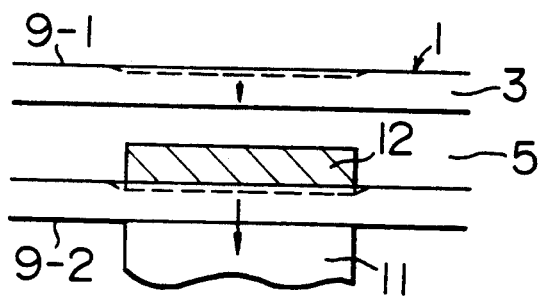
FIG. 6 is an enlarged fragmentary side view of a scroll member without a radial groove schematically illustrating a deformation caused in the scroll member by a jaw finger of a chuck jaw.

Referring to FIG. 5, the jaw fingers 12 and the radial grooves 8 are dimensioned and positioned such that each of the jaw fingers 12 has a width JW greater than a width GW of each radial groove 8 measured in the circumferential direction of the end plate 3 and is so positioned as to bridge the opposite radial side edges of the radial groove 8. This dimensional and positional relationship is important to avoid the occurrence of a phenomenon that, when an end plate 3 without such radial grooves is gripped and forcibly pulled axially against a back-up plate 11 by jaw fingers 12, each of the gripped portions 7 of the end plate 3 is resiliently deformed toward the back-up plate 11 by the axial pull force in the manner shown by a broken line in FIG. 6, with a result that the end face 9-1 of the end plate 3 follows the deformation in the gripped portion 7 and is also deformed toward the back-up plate 11, as shown by another broken line in FIG. 6. Accordingly, if the end plate 3 is machined with the deformation kept in the end face 9-1, the machining cannot assure the necessary flatness of the end face 9-1.

Figure 7:
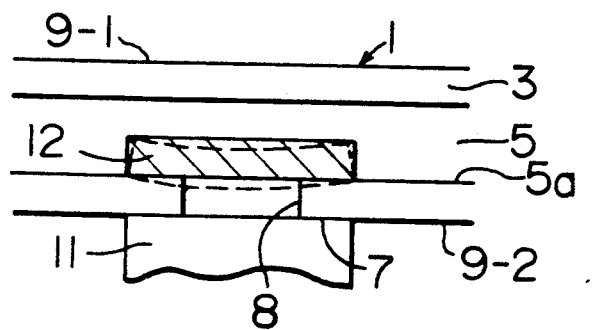
FIG. 7 is similar to FIG. 6 but schematically illustrates a deformation caused in the scroll member in which grooves are provided in accordance with the present invention.

Referring to FIG. 7, because the semi-finished orbiting scroll member 1 prepared by the method of the present invention is provided with radial grooves 8 formed in the end plate 3 and extending through the metal between the end face 9-2 and the side face 5a of the circumferential groove 5, when the portions 7 of the end plate 3 are gripped and urged by the jaw fingers 12 against the back-up plate 11, the end plate 3 is elastically deformed only in its gripped portions 7, i.e., only in limited areas. This is because, when the end plate 3 is elastically deformed, the deformation takes places in a direction in which the resistance to deformation is minimum; namely, the material of the end plate 3 is deformed into the radial grooves 8 such that the upper parts of the side faces of each radial groove 8 are inclined toward each other into the groove 8, as shown by broken lines in FIG. 7. Thus, the deformation caused at each gripped portion 7 of the end plate 3 does not develop to the end face 9-1 of the end plate 3.

Moreover, the jaw fingers 12 are also deformed into associated radial grooves 8, as schematically illustrated by broken lines in FIG. 7. Accordingly, the jaw fingers 12 are locked against the end plate 3, so that the end plate can be firmly and stably fixed to the main shaft 10a of the machine tool 10 against forces imparted to the end plate 3 laterally to the axis thereof by cutting force of the end mill 13.

Figure 8:
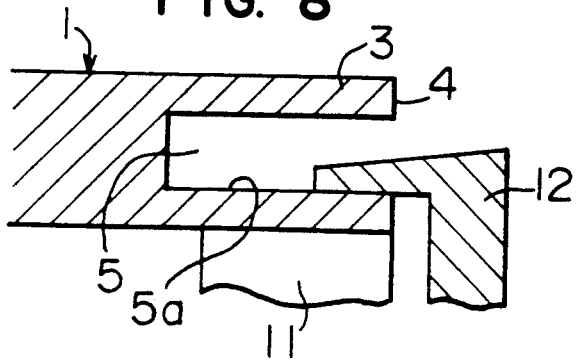
FIG. 8 is a fragmentary axial sectional view of a scroll member shaped to minimize a deformation caused therein by a chuck jaw.
Figure 9:
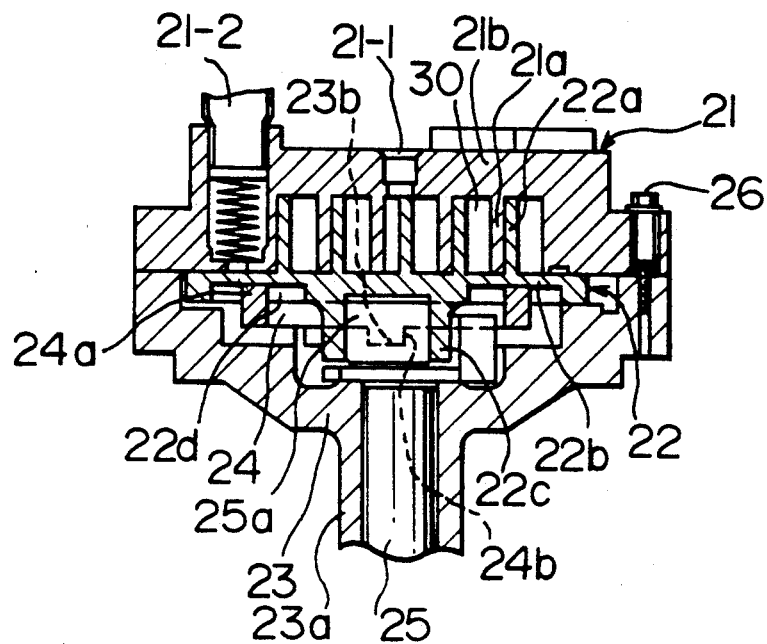
FIG. 9 is an axial sectional view of the pump section of the prior art scroll compressor.
Figure 10:
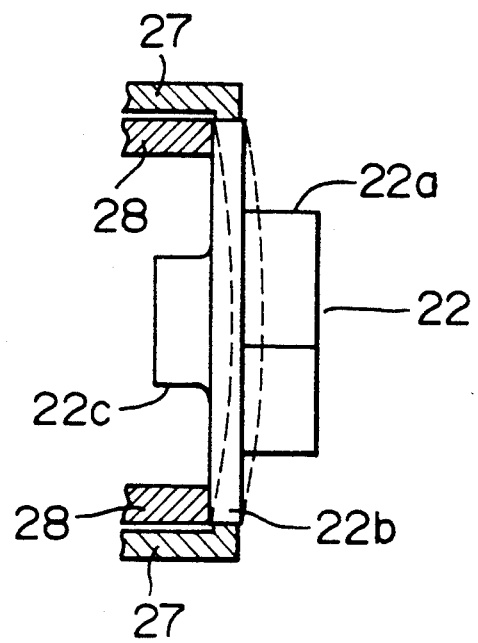
FIG. 10 is a side view of an orbiting scroll member of the prior art scroll compressor schematically illustrating a deformation caused by a radially inward gripping force exerted by a chuck jaw.

FIG. 8 shows another method of firmly fixing an end plate 3 without such radial grooves to the main shaft of the machine tool, in which method the end plate 3 is formed with a circumferential groove 5 of a substantial depth measured in the radial direction of the end plate 3. Although this method is effective to achieve the object of firmly fixing the end plate 3 without radial grooves to the machine tool, the method is not preferred because the end plate 3 of the orbiting scroll member 1 is inherently designed to be as thin as possible but the formation of the deep groove adversely affects the rigidity of the end plate with a resultant decrease in the reliability thereof.

The method of the present invention has been described as being applied to an orbiting scroll member of a scroll compressor. It is, however, to be understood that the invention can also be applied to a stationary scroll member. In addition, the circumferential groove 5 formed to provide the jaw finger engaging surfaces 5a may alternatively be a plurality of recesses (not shown) each provided with a side surface substantially perpendicular to the axis of the end plate 3 of the semifinished scroll member so that the side surface of the recess can be engaged by a jaw finger of the jaw chuck of the machine tool.

As having been described the present invention provides an improved method of fixing a scroll member of a scroll compressor to a machine tool which method utilizes elastic deformations caused in limited zones of the end plate of the scroll member as well as elastic deformations caused in jaw fingers to firmly grip the scroll member during a machining thereof without encountering the occurrence of disadvantageous deformations in the end face of the end plate, for thereby assuring a good flatness of the end plate obtained after the machining. Accordingly, the method of the present invention can assure a reliable close contacting relationship between stationary and orbiting scroll members to thereby contribute to production of a scroll compressor of an improved performance.

What is claimed is:

1. A method of working a semi-finished scroll member for a scroll compressor, said semi-finished scroll member comprising a substantially circular end plate having an axis, a first axial end face and a second axial end face with a spiral wrap extending therefrom, said method comprising the steps of:

working an outer peripheral surface of said end plate to provide jaw finger engaging surfaces spaced from said first and second axial end faces of said end plate axially thereof;

forming radially directed cuts in the outer periphery of said end plate such that each cut extends between and is open in one of the jaw finger engaging surfaces and in said first end face of said end plate;

thereafter, positioning said semi-finished scroll member relative to a machine tool having a main shaft, jaw fingers and a back-up member such that said first axial end face of said end plate is placed adjacent said back-up member of said machine tool;

then, moving said jaw fingers of said machine tool into engagement with said jaw finger engaging surfaces of said semi-finished scroll member, respectively; and moving said jaw fingers axially of said main shaft of said machine tool toward said back-up member until said first axial end face of said end plate is urged against said back-up Plate, whereby said semi-finished scroll member is firmly fixed to said machine tool and ready for machining of said second axial end face of said end Plate and of said spiral wrap thereon.

2. The scroll member working method according to claim 1, wherein a circumferential groove is formed in said outer peripheral surface of said end plate to provide said jaw finger engaging surfaces.

3. The scroll member working method according to claim 1, wherein said jaw fingers are moved toward said back-up member until the material of said end plate between said first end face thereof and said jaw finger engaging surfaces is deformed into said cuts whereby said jaw fingers are locked with the thus deformed portions of said end plate.

4. The scroll member working method according to claim 3, wherein said jaw fingers are also elastically deformed into locking engagement with said end plate.

5. A scroll member of a scroll compressor, comprising a substantially circular end plate having an axis, a first axial end face and a second axial end face with a spiral wrap extending therefrom, said end plate having an outer peripheral surface shaped to provide jaw finger engaging surfaces spaced from said first and second axial end faces of said end plate axially thereof, said end plate being provided with radially directed cuts formed in an outer periphery of said end plate such that each cut extends between and is open in one of the jaw finger engaging surfaces and in said first end face of said end plate.

6. The scroll member according to claim 5, wherein said outer peripheral surface is formed therein with a circumferential groove to provide said jaw finger engaging surfaces and wherein said jaw finger engaging surfaces are substantially perpendicular to said axis of said end plate.

7. The scroll member according to claim 5, wherein each of said radially directed cuts comprises a radial groove also open in said outer peripheral surface of said end plate.

* * * * *